United States Patent
Greenspan et al.

(10) Patent No.: US 6,247,065 B1
(45) Date of Patent: Jun. 12, 2001

(54) MESSAGING PLATFORM PROCESS

(75) Inventors: Steven Lloyd Greenspan, Scotch Plains; Bruce Lowell Hanson, Little Silver; Kenneth Mervin Huber, Middletown; Richard H. Janow, South Orange, all of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 08/773,152

(22) Filed: Dec. 26, 1996

(51) Int. Cl.[7] .......................................................... G06F 9/54
(52) U.S. Cl. .............................................. 709/313; 709/203
(58) Field of Search ........................ 395/680; 379/88.13, 379/88.17, 88.18; 709/300, 710–733, 200–208, 310–332; 717/11; 710/5, 68; 345/327; 386/83; 348/14

(56) References Cited

U.S. PATENT DOCUMENTS

| | | | |
|---|---|---|---|
| 5,557,659 | * | 9/1996 | Hyde Thomson ...................... 379/88 |
| 5,572,643 | * | 11/1996 | Judson ................................. 395/793 |
| 5,627,764 | * | 5/1997 | Schutzman et al. ............. 364/514 R |
| 5,717,742 | * | 2/1998 | Hyde Thomson ...................... 379/88 |
| 5,727,950 | * | 3/1998 | Cook et al. ........................... 434/350 |
| 5,760,823 | * | 6/1998 | Brunson et al. ....................... 348/14 |
| 5,809,242 | * | 9/1998 | Shaw et al. ....................... 395/200.47 |
| 5,818,439 | * | 10/1998 | Nagasaka et al. ................... 345/327 |
| 5,819,115 | * | 10/1998 | Hoese et al. ............................ 710/68 |
| 5,838,906 | * | 11/1998 | Doyle et al. .......................... 709/202 |
| 6,049,671 | * | 4/2000 | Slivka et al. .......................... 717/11 |
| 6,067,582 | * | 5/2000 | Smith et al. ............................. 710/5 |
| 6,118,925 | * | 9/2000 | Murata et al. ......................... 386/83 |

OTHER PUBLICATIONS

Coulouris et al., "Distributed Systems Concepts and Design," Addison–Wesley, p. 481, 1994.*

* cited by examiner

Primary Examiner—St. John Courtenay, III

(57) ABSTRACT

Numerous benefits are realized by allowing messaging platforms to receive and act on information packages that include one or more Execution Instruction Sets (EISs), where the EIS is executed as specified. Execution of the included EISs provides vastly enhanced capabilities to the messaging platform, such as controlling when an EIS is executed, from where necessary data is obtained for the execution of the EIS, what kinds of executions are permitted, who will be the recipients of the content portion of platform, what that content will be, etc. Increasing the interaction complexity a step further, the EIS permits creation of an interactive session with the recipient that makes the message more effective. A still additional capability is the establishment of a communication path from the messaging platform. This may be in the form of a message that is sent by the messaging platform, or a connection that is established between the recipient and some other party.

52 Claims, 2 Drawing Sheets

MESSAGING PLATFORM PROCESS

BACKGROUND OF THE INVENTION

This invention relates to messaging platforms and, more particularly, to messaging platforms that are capable of automatically executing programs that arrive with or constitute a part of a message.

Telecommunications networks typically connect a calling party to a called party and the ensuing communication comprises transmitting voice and/or data information. Sometimes, the effective "parties" are computers which, under operator or stored program control, send and receive information; e.g., files of data. In the context of communication between computers, either a computer receives information in response to a request, or a computer receives information without having requested it. The latter condition—that of receiving information without having requested it—basically describes messaging platforms; and the instant invention relates to such platforms. Of course, an attendant attribute of messaging platforms is that once they accept messages when they arrive from senders, they hold them until the messages are delivered to or picked up by the recipients.

In the disclosure that follows, the term "information package" is used for the collection of signals that are communicated to a recipient messaging platform. As described in greater detail hereinafter, the "package" may contain more than just the content of the message that the recipient is to receive.

Voice messaging platforms communicate voice information packages pursuant to a sending party's request, and those are quite well known. Structurally, the platform comprises a storage medium and an associated processor that is connected to the telecommunications network. When a party wishes to leave a message for a particular recipient, the telecommunications network connects the party to the platform and the platform prompts the party to leave the message. The offered message is then stored in the storage medium and action is taken to inform the recipient that a message has been received. In some applications, the action taken comprises repeated attempts to reach the recipient. In other applications, the action taken comprises the setting of conditions in a central office to which the recipient is connected, causing a signal to be communicated to the recipient that a message has been received. Typically, that signal is a stutter dial tone that the recipient receives when he or she goes off hook to initiate a call.

While we view arrangements where packages that are destined for a recipient and are sent to a particular platform as "messaging platforms", it should be recognized that there are some differences between typical e-mail arrangements and typical voice messaging arrangements. Specifically, aside from the difference that voice messaging platforms store voice, the more basic difference is that voice messaging platforms typically interact with the remote sender of the message by providing the sender a sequence of prompts, whereas in the e-mail situation, the receiving platform is passive (vis-à-vis the sender).

Three characteristics that are common to all messaging platforms and which are relevant to the instant disclosure are:

that the messaging platform receives information strictly in response to the wishes of message senders, that the identity of the recipient is explicitly provided to the messaging platform, and that the message received by the platform is precisely the message provided to the recipient.

Various advantages can be realized by circumventing the limitations imposed by the two last-mentioned characteristics.

SUMMARY OF THE INVENTION

Numerous benefits are realized by allowing messaging platforms to receive and act on information packages that include one or more Execution Instruction Sets (herein abbreviated to "EISs"), where the EIS is executed as specified.

Execution of the included EISs provides vastly enhanced capabilities to the messaging platform. This includes, for example, controlling when an EIS is executed, from where necessary data is obtained for the execution of the EIS, what kinds of executions are permitted, who will be the recipients of the content portion of the information package, what that content will be, etc. Increasing the interaction complexity a step further, the EIS permits creation of an interactive session with the recipient that makes the message more effective. A still additional capability is the establishment of a communication path from the messaging platform. This may be in the form of a message that is sent by the messaging platform, or a connection that is established between the recipient and some other party.

The messaging platform capabilities disclosed herein extend to traditional voice messages, e-mail messages, video messages, fax messages, data files, and to combinations of the above.

DETAILED DESCRIPTION

The following nomenclature shall be use in the instant disclosure. The collection of information that is provided, to a messaging platform is the "information package." It can be received by the platform as a single file, it can be accumulated by the messaging platform, and its content can be voice, data, or both.

The "information package" may include an "addressee information portion," a "sender information portion," one or more "EIS portions," a "data portion," and a "content portion." When the messaging platform is accessed by a party for whom the sender sent an information package, the party is provided with a "message," which is an instantiation of the information that the sender wished to communicate to the recipient.

Also, the message may correspond to the content portion of the information package, to a modified version of the content portion, or be wholly created from other than the content portion (typically when a content portion is not included in the information package). The message may be such that it presents to the party accessing the platform a voice segment (the typical voice messaging arrangement), text (the typical e-mail arrangement), text with images, images (which may include text images), or video (images that change with time).

Additionally, the message may also comprise a "first page," which is what is presented to the recipient first, and "subsequent pages," which are presented to the recipient in response to some action by the recipient. A typical prior art arrangement of the "first page" and "subsequent pages" concept is found in e-mail that may comprise a text message plus an icon in the first page, and the icon points to an attachment which typically is a text file. (A non-messaging platform example, which is described in more detail below, is the Internet.) That text file, according to the above defined nomenclature, comprises one of the "subsequent pages." Lastly, the "message" might not be completely pre-stored in the platform. That is, some or all of the message may be created for the recipient at the time the recipient accesses the platform.

Figure 1:
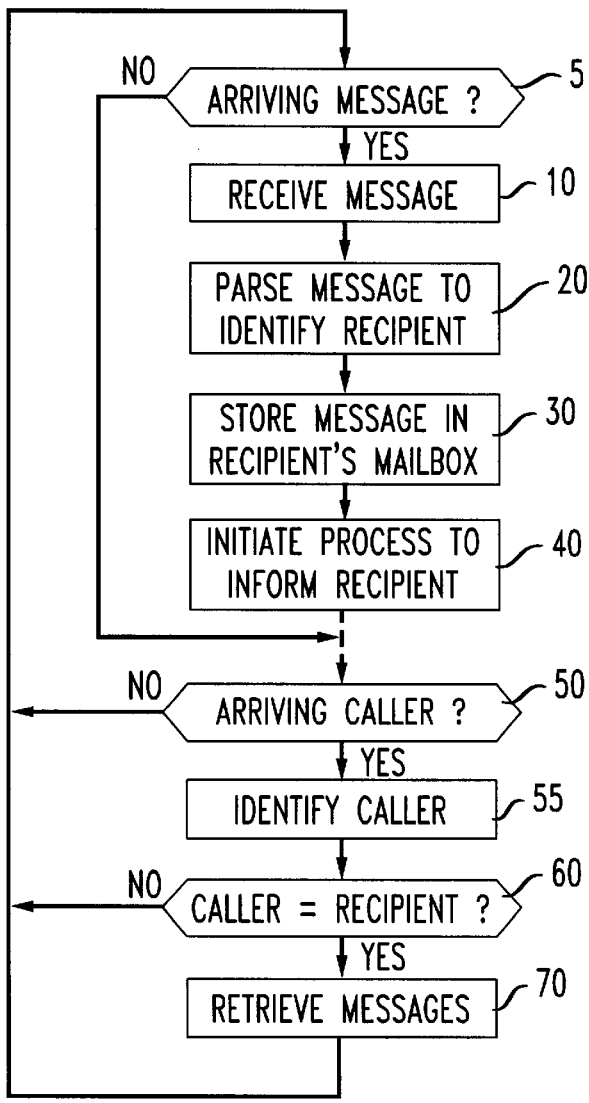
FIG. 1 depicts a flow chart of the process carried out by prior art messaging platforms.

FIG. 1 presents a flow chart of the process carried out in conventional voice messaging platforms; and as can be observed, it repeats cyclically. Block 5 determines whether a new information package is present at the platform. When it is, control passes to block 10. Otherwise, control passes to block 50. Block 10 is responsible for receiving arriving information packages. This well known function is responsible for communication with the telecommunication network via a particular agreed-upon protocol. It may comprise a voice response unit that prompts a calling party to leave a voice message, software adapted for receiving e-mail, etc. Once the information package is received in the platform, block 20 parses the information package to identify the recipient. In the case of e-mail, the recipient is specified in the addressee information portion of the information package, and the software therefore merely looks at that part of the information package. Once the recipient is identified, block 30 stores the message in the recipient's mailbox, if appropriate. If the recipient is not recognized by the messaging platform, the message is either returned to the sender or discarded with or without an appropriate message to the sender. In the case of voice messaging platforms, some systems receive messages only from recognized recipients (by means of a discrimination process carried out in the telecommunication network) or they create mailboxes for whichever recipient is identified.

As an aside, while the disclosure speaks of information packages arriving and the messaging platform, or arriving at the messaging platform from the communications network, there is a known condition where the sender and the recipient(s) are associated with the same messaging platform and, in such a case, the information package from the sender does not, strictly speaking, "arrive" at the platform. Still, for purposes of the instant disclosure and the appended claims, terms such as "arriving" and "receiving" are intended to include the notion of an information package "arriving" at or being "received" at a messaging platform even when the sender is on the same platform.

Returning to FIG. 1, block 40 initiates a process for informing the recipient that a message has arrived. In the case of voice messaging platforms, that may conventionally comprise repeated attempts to connect to the recipient's phone. In the case of e-mail, for example, that may comprise setting of an appropriate flag associated with that recipient that causes a message to be given (such as "you have mail") when the recipient logs on to the platform.

The flow chart of FIG. 1 continues with a dotted line leading to block 50. The dotted line intends to suggest that the process which includes blocks 50–70, as it is drawn, may be a continuation of the process that encompasses blocks 10–40, or it may be an independent process that encompasses only blocks 50–70. Block 50 determines whether a party accessed ("called in") the platform to retrieve messages. If so, control passes to block 55. Otherwise, control passes to block 5. Block 55 identifies the caller. Once the caller is identified, block 60 determines whether there is a message waiting for the caller; i.e., whether the caller is also a recipient of a stored message. If such a message exists, control passes to block 70 where the message, and all other messages for that recipient, are provided to the recipient, typically in an interactive manner.

Figure 2:
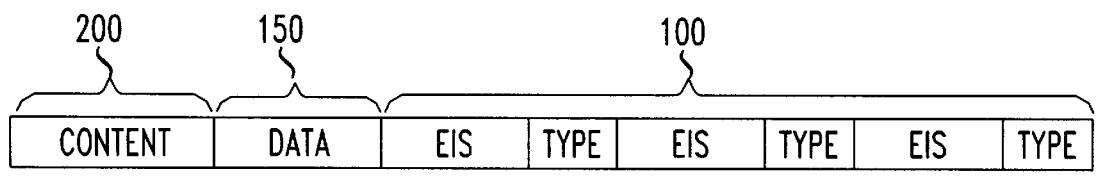
FIG. 2 shows one construction of an information package in conformance with the principles disclosed herein that may be sent to a messaging platform.

FIG. 2 presents a portion of one information package construct that comports with the principles disclosed herein. It includes an EIS portion 100 followed by a data portion 150 and a content portion 200 (the addressee information portion and the sender information portion are not shown, for sake of simplicity). The combination of the EIS portion and the data portion can also be thought of as the "program portion." EIS portion 100 is depicted to have execution portions and each such portion contains a type identifier coupled to EIS text (e.g., program code). The type identifier specifies whether the EIS is to be executed when it arrives, at some specified time or times (e.g., at 6 p.m.), at some computable time (e.g., four hours from now), or at the time the recipient accesses his or her messages.

Figure 3:
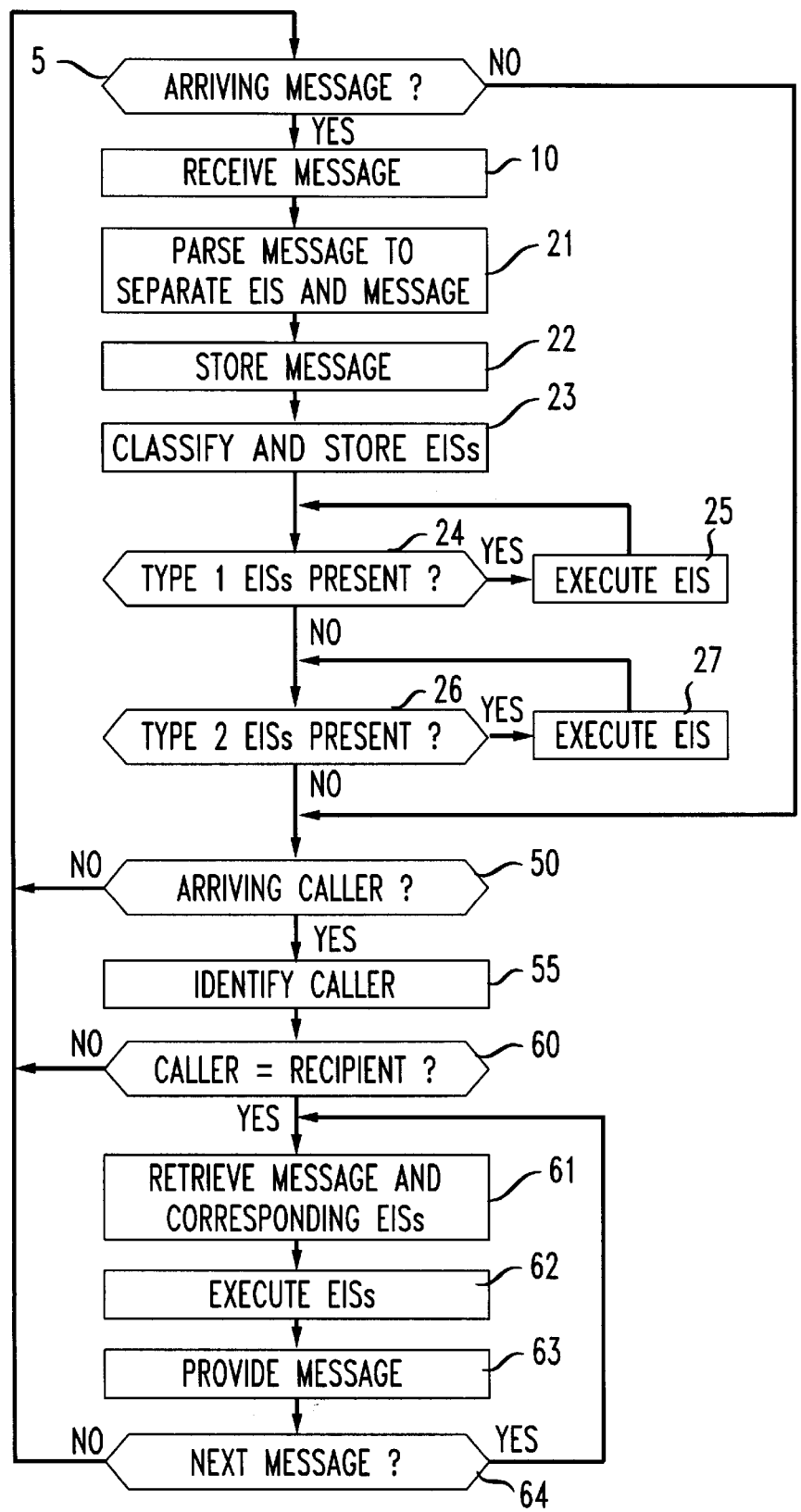
FIG. 3 presents a flow chart of the process carried out by the improved messaging platform disclosed herein.

FIG. 3 is a flow chart of the processes carried out by a messaging platform that implements the disclosed principles. Like FIG. 1, FIG. 3 depicts a cyclically repeating process. Block 5 determines whether a new information package is present at the platform. If a new information package is present, control passes to block 10. Otherwise, control passes to block 50. Also as in FIG. 1, block 10 receives the information package. Block 21 parses the information package to separate the EIS portions contained in the information package and the content portion contained in the information package(and also identify the recipient if that information is sufficiently definite). Block 22 stores the content portion in a pre-assigned area of the platform's memory, and block 23 stores and classifies the received EISs that are associated with the content portion. Illustratively, the classification is into type 1, 2 or 3: a type 1 EIS is one that is to be executed when the message arrives, a type 2 EIS is one that is to be executed at a predefined or computable time, and a type 3 EIS is one that is to be executed at time of access.

Block 24 ascertains whether at least one type 1 EIS is present. If one is, block 25 executes it and returns control to block 24. After all type 1 EISs are executed, block 26 determines whether at least one type 2 EIS is present. If such an EIS is present, block 27 executes it and returns control to block 26. In executing type 2 EISs, block 27 first determines the time at which the EIS code is to be executed. This information may be embedded in the type field, in the remainder of the EIS portion, or in the data field (a choice of the protocol's designer). Block 27 then sets a timer and enters a wait loop. When the appropriate time arrives, the remainder of the EIS code is executed.

Both blocks 25 and 27 include a call to execution modules that are standard to the messaging platform (analogous to the functions of blocks 20, 30 and 40 in FIG. 1). The call is effected when recipients of the content portion are known to the platform, and the modules store information in the appropriate mailbox and initiate processes to inform a recipient of the fact that a message is available. The modules may include other processing as well. It should be recognized, of course, that if a type 1 or type 2 EIS causes the identification of more than one recipient for the content portion of the information package, then blocks 25 or 27 will have created a number of images of the content (perhaps identical and perhaps not) and the called execution modules place the various messages for the various recipients in the appropriate mailboxes.

It may also be noted that when the content portion is determined to have a number of recipients, one option is to keep the content portion of the information package (or even the message itself, if it is common to all recipients) in a common area and insert a pointer in the mailboxes of the appropriate recipients to link to the common area where the message is stored. The linking approach is a fairly straightforward programming tool that is used extensively, including in the Internet environment (linking to a specific location in a file, or to a specific file in any Internet site). Indeed, by use of the linking approach messages can be stored in a storage area that is outside the messaging platform.

Block 50, as in FIG. 1, determines whether a party has accessed ("called in") the messaging platform to retrieve messages. When there are no such incoming calls, control passes to block 5. Otherwise, control passes to block 55 where the identity of the calling party is ascertained. Thereafter, block 60 determines whether the calling party is a recipient of a stored message. When that is the case, control passes to block 61. Otherwise, control returns to block 5.

Block 61 is the first block in a loop which comprises blocks 61, 62, 63 and 64. Block 61 selects a first message for the recipient (perhaps pursuant to a selection by the recipient) and the corresponding type 2 and type 3 EISs. Block 61 first retrieves the type 2 EISs to determine whether the EISs have been executed; i.e., whether the EISs' time of execution has arrived. If it has not, the unexecuted EIS is either executed as if its time of arrival has arrived, or not executed at all, depending on a predetermined flag set by the sender within the execution code of the EIS. Thereafter, the type 3 EISs are executed. The EISs are executed in block 62. Once the EISs have been executed, the message is provided to the recipient by block 63 and control passes to block 64 which determines whether additional messages exist for that recipient. If that is the case, control returns to block 61. Otherwise, control passes to block 5.

It may be noted that blocks 62 and 63 may cooperate in the course of executing the type 3 EIS. For example, the type 3 EIS may specify that a portion of the stored message should be provided to the recipient, followed by a prompt that invites the recipient to provide an input signal. Based on that input signal, the EIS may provide additional information or message portions to the recipient, or may take some other measures. That, basically, describes an interactive messaging session.

FIG. 2 includes data portion 150. This field increases the power of the improved messaging platform further by providing a mechanism for the message sender to provide data. This data may be used by the various EISs to control what is executed, how it is executed, and what data is employed in the course of execution. In the examples that follow, some of the power inherent in the inclusion of a data portion may be better appreciated.

The discussion above addressed itself to the processes carried out in the messaging platform once a message arrives. There is, of course, the question of how EISs are created in the platform that creates the message to be sent. This question may be answered differently for different media. For example, when leaving a voice message, the creation of the message for the recipient is effectively accomplished in the platform where the message is stored. In other applications, such as e-mail, the message is created in a platform under the control of the sender. Clearly, in the latter example, it is easier for the sender to create EISs that have different, and sophisticated, execution programs. In voice message platforms, on the other hand, the user will most likely be limited to a selection from among a preselected set of EISs.

The tremendous enhancements that are possible with a messaging platform that operates in accordance with the present disclosure are almost innumerable. The following describes but a few of them.

Different Platforms have Different Features.

It is our expectation that the telecommunication network in the United States will comprise messaging platforms that are manufactured by different concerns. It is not unlikely that such platforms will have different capabilities. This includes different features and perhaps even common features that are implemented differently. A messaging platform in accordance with the principles disclosed herein would execute the EISs that are included in the arriving messages to create message portions that are either as intended by the sender or as close to it as can be achieved on the particular receiving messaging platform.

EISs that are Pointers to Pre-Stored Processing

One concern that exists with messaging platforms where an incoming information package includes executable code is security. In the abstract, it is possible to guard against the acquisition of viruses that can play havoc with the messaging platform, but people are leery of arrangements that permit the effective downloading of software. While the operating system of the messaging platform can be imbued with virus protections (e.g., analyze the incoming information packages, limit the area to which EISs can write data, etc.), it is also possible to guard against viruses by slightly modifying the function of the EISs. Specifically, the messaging platform can be arranged to include a large number of EISs (of all types), and the information package can be limited to merely specifying which of the EISs that are resident in the messaging platform are to be executed. Thus, the notion of an EIS is broader than merely a collection of executable code (the art sometimes refers to such code as an "applet") and extends to a mere pointer to resident code.

More than One Recipient Share a Message.

Since the EIS is executed on the messaging platform, it is possible to modify various segments, or fields, of the message portion based on a variety of factors. As indicated above, one such field may be the recipient, or recipients, of the content portion. Typically, a sender who constructs the information package would create an incompletely defined addressee and provide information that allows the messaging platform to execute and determine the identity of one or more addressees. The recipient may be specified by means of the EIS accessing data portion 150, accessing a database within the messaging platform, or accessing a database outside the messaging platform. The database accessing may be of the type that is intimately related to the sender. For example, "go to my list of soccer team players" (specified beforehand by the sender), or "broadcast to everyone on my block" (related to an attribute of the sender). The database accessing may also be of the type that relates to an attribute of the recipients. For example, "broadcast to all Division Managers", etc.

Content Modifications.

Another portion of the message that may be conveniently modified is the salutation to the recipient. That would, of course, have to be created by the EIS after the recipients are identified. It may be noted that accesses to such a database can be based on information that is personal to the recipients, stored in the messaging platform, and not shared with the outside world. This may be attractive to people who are protective of their privacy.

In some languages the verbs are gender sensitive. For such languages it desirable to change the verb gender based on the gender of the recipient, and that information can also be obtained from a database that the messaging platform maintains of its recipients.

Finally, sensitivity to the sender's information can also be obtained. For example, the message to the recipient may be accompanied by a picture that is generated locally in the messaging platform. Thus, when the sender is a male, for example, a male's generic picture/icon can be presented.

Time Sensitive Messages.

As indicated above, type 2 EISs are executed at a specified time. This is very useful in many applications where the sent messages are, effectively, reminders. A sender may determine that reminders presented too early are ineffective and, certainly, reminders that are presented too late are useless. The capability to inject a message into a recipient's mailbox no sooner than a certain time and to, perhaps, extract it from the mailbox after a certain time is therefore very useful.

Operating on Stored Messages

The above example of extracting a message from storage because the time of its viability has passed can be implemented, as indicated above, with an appropriate EIS and data (perhaps in the data portion) that is included in the information package. However, it can also be realized with a separate information package from the same sender. This can be achieved by permitting the sender to operate on messages that were previously sent by the sender. In a sense, this is a more powerful capability because a sender may not know at the time that he or she sends an information package that at some future time the sender would like to rescind it. By including a message ID, for example, the sender of an information package can send another information package that includes a message ID and a selected operation relative to the message or messages in the platform that have that message ID. The selected operation can be a deletion, a partial modification of the message or messages, or even a complete substitution.

Interactive Messages.

Type 3 EISs can be used to achieve all of the functionalities that are achievable with type 1 and/or type 2 EISs other than resolving recipient ambiguities. On the other hand, type 3 EISs can implement functionalities that directly interact with the recipient.

There are many examples where type 3 EISs control the message that is delivered to the recipient. One such example is control of the message delivered to a recipient when the content portion of the information package comprises a plurality of message sub-portions which are selected and delivered to the recipient based on responses provided by the recipient to prompts. For example, a customer may have inquired with Sears about the availability of certain items. Sears may then send an information package where the message delivered to the recipient begins with "Dear Mrs. Smith, you have inquired about the availability of snow blowers, shoes and parkas. Press 1 for the location of the Sears store that currently carries the snow blowers; press 2 for the shoes; and press 3 for the parkas." The customer may at that point be interested only in the snow blower; therefore the customer would press 1, listen to the message about the snow blowers and hang up.

Another example of an interactive message may be one that includes the statement "Press 1 if you wish to send back a message or press 2 if you wish to be connected to the sender." Again, the customer may press 1, 2, or neither. When the customer presses 1, the messaging platform initiates a process that accepts the message recipient's return information package and attempts to contact the sender and deliver that recipient's response. Of course, if the sender is unavailable and connection is made to another (or the same) messaging platform, then the returned information package is stored in that other message platform. When the customer presses 2, the messaging platform can simply couple the message's recipient to a central office line to provide a dial tone and the ability to establish a call.

A more sophisticated approach may be for the messaging platform to obtain the destination for the about-to-be-launched call either from the information package itself (by determining who the sender was from the sender information portion of the information package, and the sender's phone number from a database) or from the message's recipient, establish a call as requested, and bridge the message's recipient to the established call. Software for implementing the return messaging—which, effectively, is also the software for making outgoing calls—is well known.

Still another example of an interactive message is one where the message requests the recipient to provide information. The information thus provided (voice and/or data) can then be sent by the messaging platform to a destination specified in the EIS. This, effectively, is a polling application.

Mixed Media Messages.

The ability to perform processing generally, and processing on sub-portions of the content portion in particular, allows for an easy incorporation of messages that mix media. For example, a content portion of an information package may contain one sub-portion that is a video, another sub-portion that is text or an image, and still another sub-portion that is voice. An appropriately provisioned EIS can take care of outputting the various message sub-portions to the recipient as the nature of the information requires.

Linked Messages.

The above suggests that the different media sub-portions are presented to the recipient in the order specified by the sender, but that is not a limitation of the process disclosed herein. The broader scope is appreciated by viewing the message presented to the recipient as one that has a first page and subsequent pages. In the Internet environment, which is not a messaging environment, the notion of first page and subsequent pages is well known. When a user is connected to the Internet, the user is presented with a page which typically is the "home page" of the provider (although the first page can in fact be selected by the user). The home page has image buttons or text buttons, and clicking on those buttons connects the user to a different location in a file, to a different file in the same Internet site, or to a file in another Internet site.

In a similar manner, the message presented to a recipient in the context of this disclosure can contain a first page which includes voice, image, or text buttons, and subsequent pages. The subsequent pages may be comprised of sub-portions of the information package, may be derived from information that is local to the messaging platform, or it may be remote to the messaging platform.

An example where an information package might contain no content portion at all is one where, for example, the sender sends an information package with an EIS that connects the recipient to the sender's home page. The recipient would thus be connected to the Internet, would be privy to that which the sender wished the recipient to access, and would have the ability to expand from there to "surf" on the Internet.

We claim:

1. A method comprising the steps of:
   receiving an information package from a sender, addressed to a specified recipient, at a server messaging platform which accepts the information package and stores messages in recipient mailboxes that can be accessed by recipients;
   prior to a request by said recipient for any information received by said platform for said recipient, said server messaging platform extracting from said information package a content portion and a program portion that contains at least one execution instruction set (EIS) that specifies when the EIS is to be executed; and
   executing the at least one EIS.

2. The method of claim 1 where the program portion contains more than one EIS.

3. The method of claim 1 where the step of executing includes the step of assessing when the EIS needs to be executed.

4. The method of claim 1 where the program portion includes an instructions portion and a data portion.

5. The method of claim 1 where the step of executing includes executing instruction steps of an EIS at time of arrival of the information packages at the platform, at a specified time, at a computable time, or at time of recipient's request to said messaging platform to access a message corresponding to the information package.

6. The method of claim 1 where the step of executing results in an identification of at least one recipient for the content portion.

7. The method of claim 1 where the step of executing results in an identification of two or more recipients of the content portion and the content portion is personalized for each recipient.

8. The method of claim 1 where the step of executing utilizes data stored in the message platform or outside the message platform.

9. The method of claim 1 where the step of executing utilizes data in the program portion.

10. The method of claim 1 where the step of executing utilizes data in the data portion.

11. The method of claim 1 where the message portion includes an incompletely determined recipient identification and the step of executing explicitly determines identity of at least one recipient.

12. The method of claim 1 where an EIS is executed when a recipient accesses the platform to receive messages addressed to the recipient.

13. The method of claim 1 where the content portion comprises a voice message, an e-mail message, a fax message, a video message, or a data file message.

14. The method of claim 3 where identity of a recipient is determined by executing an EIS either at time of arrival or at a specified time.

15. The method of claim 3 where in the course of executing the at least one EIS the content portion is instantiated for a recipient for whom said information package is destined, to form a message that is personalized for the recipient, either at time of arrival or at a specified time.

16. The method of claim 4 where the data portion comprises data that is employed in the course of executing the instructions portion.

17. The method of claim 1 where EISs of the program portion are executed at different times.

18. The method of claim 12 where execution of the EIS at the time when the recipient accesses the platform results in an interactive communication between the message platform and the recipient.

19. The method of claim 12 where execution of the EIS at the time when the recipient accesses the platform results in the recipient being connected to a party.

20. The method of claim 15 where the instantiating to form the message modifies the content portion.

21. The method of claim 15 where the instantiating to form the message employs a subset of the content portion.

22. The method of claim 15 where the instantiating to form the message creates a message without employing information contained in the content portion.

23. The method of claim 15 where the instantiation comprises placing the message in a storage area assigned to a particular recipient, or placing a pointer in the storage area assigned to a particular recipient, which pointer links to another storage area where the message is stored.

24. The method of claim 18 where the interactive communication results in the message platform sending out an outgoing message to the telecommunication network.

25. The method of claim 19 where the party to whom the recipient is connected is the party that sent the information package to the recipient.

26. The method of claim 23 where said another storage area is associated with a processor that is other than a processor of the messaging platform.

27. The method of claim 24 where the outgoing message comprises data provided by the recipient.

28. The method of claim 24 where the outgoing message is a voice message destined to the party that sent the message to the recipient.

29. A method comprising the steps of:
   receiving an information package from a sender, addressed to a specified recipient, at a server messaging platform that is remote to said recipient;
   prior to a request by said recipient for any information received by said platform for said recipient, extracting from the information package a content portion and a program portion; and
   identifying in the program portion parsed out of said information package at least one execution instruction set (EIS) that, when executed, a) presents a first page to a recipient accessing the messaging platform, and b) in response to an input from the recipient presents to the recipient a subsequent page.

30. The method of claim 29 where the first page is a home page on an Internet site.

31. The method of claim 29 where the subsequent page is a page on an Internet site.

32. A method executed at a server messaging platform comprising the steps of:
   receiving an information package from a sender, addressed to a specified recipient, at said server messaging platform;
   prior to a request by said recipient for any information received by said platform for said recipient, extracting from the information package a program portion and a content portion, where the content portion comprises a first page and at least one subsequent page, and the first page of the content portion is either a voice message, an image message, or a video message; and
   executing the at least one EIS.

33. A method comprising the steps of:
   receiving at a server messaging platform an e-mail message from a sender, which message consists of an information package;
   prior to a request by said recipient for any information received by said platform for said recipient that has a mailbox at said server messaging platform, extracting from the information package a content portion and a data portion that imprecisely specifies addressees of the content portion; and executing a process to precisely specify addressees, where the number of addressees so specified is zero, one, or more than one.

34. The method of claim 33 further comprising the steps of assigning the content portion to a mailbox of each specified addressee to form messages for those addressees, and personalizing those messages for the addressees.

35. The method of claim 34 where the step of personalizing is effected when the content portion is assigned to a mailbox or when the content portion is accessed.

36. A method comprising the steps of:

receiving at a server messaging platform an information package from a sender, addressed to a specified recipient;

prior to a request by said recipient for any information received by said platform for said recipient, extracting from the information package a content portion and a program portion that contains at least one execution instruction set (EIS) which determines specific content of a message presented to a recipient when the recipient accesses the platform, where said content of a message that is present to said recipient is related to said content portion that is extracted from said information package; and executing the at least one EIS.

37. The method of claim 36 where the modification comprises personalization of the specific content based on data included the instruction portion.

38. The method of claim 36 where the process of determining comprises modifying the content portion parsed by the platform to form said message.

39. The method of claim 36 where the process of determining comprises adding to the content portion parsed by the platform to form said message.

40. The method of claim 36 where the process of determining comprises selecting a subset of the content portion parsed by the platform to form said message.

41. The method of claim 36 where the process of determining comprises modifying the specific content presented to the recipient based on an attribute of the recipient.

42. The method of claim 36 where the process of determining comprises modifying an image presented to the recipient based on an attribute of the sender.

43. The method of claim 36 where the modification comprises personalization of the specific content based on data included in a database that is either local to or remote from the platform.

44. A method comprising the steps of:

receiving an information package from a sender, addressed to a specified recipient, at a sender messaging platform to which clients connect via a telecommunications network;

prior to a request by said recipient for any information received by said platform for said recipient, extracting from the information package a content portion and a program portion that contains at least one reference to an executable module that is resident in the platform and that executes an action other than related to the process of displaying said content portion; and executing the module.

45. The method of claim 44 where the reference includes a time-of-execution specification, which specifies a time certain, a computable time, a time of arrival execution, or a time of access execution, and the step of executing executes the module at the time-of-execution specified by the reference.

46. A method executed at a server messaging platform comprising the steps of:

receiving an information package at the messaging platform;

prior to a request by said recipient for any information received by said platform for said recipient, extracting from the information package a content portion and a program portion that contains at least one execution instruction set (EIS) and a data portion, where the data portion is employed in the course of executing the EIS; and executing the at least one EIS to form at least one message.

47. The method of claim 46 where the data determines a time when the message is deleted.

48. The method of claim 46 where the data determines a time when the message is changed or modified.

49. The method of claim 46 where the data is used to personalize content presented to recipients.

50. A method executed at a server messaging platform comprising the steps of:

receiving an information package at the messaging platform;

prior to a request by said recipient for any information received by said platform for said recipient, extracting from the information package a content portion and a program portion that contains at least one execution instruction set (EIS) and a data portion, where the data portion identifies a message created from another information package (ID'ed message) and is employed in the course of executing the EIS; and executing the at least one EIS to process the ID'ed message.

51. The method of claim 50 where the processing comprises deleting the ID'ed message.

52. The method of claim 50 where the processing comprises substituting the ID'ed message with at least a portion of the content portion.

* * * * *